United States Patent
Salmani et al.

(10) Patent No.: US 12,341,583 B2
(45) Date of Patent: Jun. 24, 2025

(54) CODEBOOK-BASED BEAMFORMING WITH RANDOM FOREST ON CONTENT ADDRESSABLE MEMORY

(71) Applicant: HUAWEI TECHNOLOGIES CO., LTD., Shenzhen (CN)

(72) Inventors: Mahsa Salmani, Kanata (CA); Sreenil Saha, Kanata (CA); Armaghan Eshaghi, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 133 days.

(21) Appl. No.: 18/373,500

(22) Filed: Sep. 27, 2023

(65) Prior Publication Data

US 2024/0137083 A1 Apr. 25, 2024
US 2024/0235629 A9 Jul. 11, 2024

Related U.S. Application Data

(60) Provisional application No. 63/419,270, filed on Oct. 25, 2022.

(51) Int. Cl.
*H04B 7/0456* (2017.01)
*H04B 7/06* (2006.01)

(52) U.S. Cl.
CPC ......... *H04B 7/0482* (2013.01); *H04B 7/0617* (2013.01)

(58) Field of Classification Search
CPC ............................ H04B 7/0482; H04B 7/0617
USPC .......................................................... 375/267
See application file for complete search history.

(56) References Cited

FOREIGN PATENT DOCUMENTS

| CN | 114071627 | * | 2/2022 | |
|---|---|---|---|---|
| WO | WO-2021203242 A1 | * | 10/2021 | ........... G06N 3/0454 |
| WO | WO-2022234917 A1 | * | 11/2022 | ............. G06N 20/00 |

OTHER PUBLICATIONS

Pedretti, Giacomo, et al. "Tree-based machine learning performed in-memory with memristive analog CAM." Nature communications 12.1 (2021): 1-10.
Alkhateeb, Ahmed, et al. "Channel estimation and hybrid precoding for millimeter wave cellular systems." IEEE journal of selected topics in signal processing 8.5 (2014): 831-846.
Chiu, Sung-En, Nancy Ronquillo, and Tara Javidi. "Active learning and CSI acquisition for mmWave initial alignment." IEEE Journal on Selected Areas in Communications 37.11 (2019): 2474-2489.
Bellili, Faouzi, Foad Sohrabi, and Wei Yu. "Generalized approximate message passing for massive MIMO mmWave channel estimation with Laplacian prior." IEEE Transactions on Communications 67.5 (2019): 3205-3219.

* cited by examiner

*Primary Examiner* — Leila Malek

(57) ABSTRACT

A codebook-based beamforming architecture utilizes a random forest tree classification machine learning approach in order to circumvent the channel sensing step when designing a beamforming architecture. The random forest tree may be represented by a matrix. A content addressable memory (CAM) may be used to implement the codebook matrix based beamforming architecture using a random forest classifier allowing a near optimal codeword to be selected with a uniform delay. A photonics-based CAM may be used to exploit the high bandwidth and the low power consumption of optical components.

20 Claims, 9 Drawing Sheets

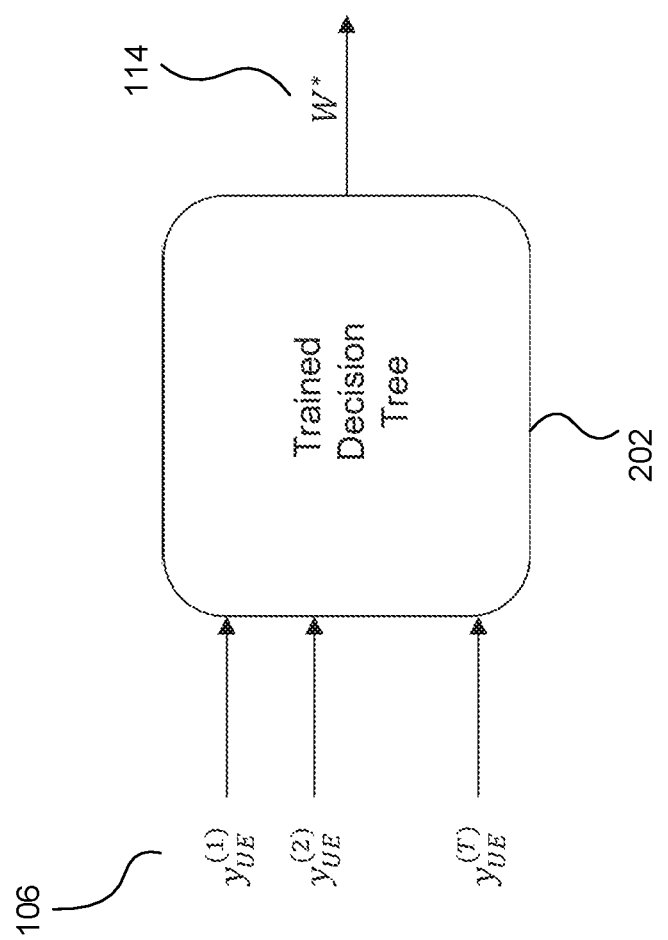

CODEBOOK-BASED BEAMFORMING WITH RANDOM FOREST ON CONTENT ADDRESSABLE MEMORY

CROSS-REFERENCE TO RELATED APPLICATIONS

This application claims the benefit of priority to U.S. Provisional Patent Application No. 63/419,270 filed on Oct. 25, 2022, entitled "CODEBOOK-BASED BEAMFORMING WITH RANDOM FOREST ON CONTENT ADDRESSABLE MEMORY", the entire contents of which are incorporated herein by reference in its entirety.

FIELD OF THE INVENTION

This disclosure pertains generally to the field of wireless communications and in particular to methods and apparatus for selecting codewords used in beamforming applications.

BACKGROUND OF THE INVENTION

The high transmission rate and the spectral efficiency that can be offered by millimeter wave (mmWave) communication with massive multiple-input multiple-output (MIMO) antenna array make it a promising technology for the next generations of wireless communication networks, i.e., 5G and 6G. While the short wavelengths in mmWave communication systems inherently imposes high pathloss to the system, that can be exploited to deploy a large array of antenna elements in a relatively small area. Massive MIMO mmWave systems can form highly directional beams to mitigate the pathloss and provide a strong signal received by the receivers. Beamforming is conventionally achieved by changing the phase of the input signal on each of the antenna elements such that the signals add up constructively or destructively, and hence, be targeted to a specific receiver. In general, there are different beamforming architectures. Analog beamformers, in which all antenna elements are connected to a single radio frequency chain, are power efficient while they can only support one data stream. On the other hand, digital beamformers, in which each single antenna in the massive antenna array is equipped with one radio frequency chain, can support multiple data streams while the cost and power consumption is huge due to the mix-signal components that are used. Considering the drawbacks of each of those architectures, a fusion approach called hybrid beamforming has been introduced.

Realizing any of the aforementioned beamforming architectures requires a precise estimation of the channel state information (CSI) during the initial access phase, i.e., channel training phase. In particular, identifying the dominant, i.e., the strongest, path of the signal between transmitter and receiver, namely beam training, is important to design the beamforming architecture. The most straight forward approach for beam training is to exhaustively search through all possible directions and find the strongest one. That needs testing all possible paths and hence, imposes a huge computational cost to the system. Accordingly different channel training algorithms have been proposed to iteratively obtain the channel coefficient without prior knowledge at the transmitter. However, in a system with massive number of antenna elements, it is almost infeasible to capture perfect CSI. Therefore, there have been different channel estimation approaches proposed to obtain the CSI prior to designing the beamforming architecture.

In codebook-based beamforming the beamforming vectors can be selected from a set (called a "codebook") of pre-defined beams each of which may be aimed at one specific direction. Different approaches to design codebooks for beamforming in different scenarios and to employ previously designed beamforming codebooks have been proposed. For instance, different approaches based on hierarchical codebook have been proposed in which the codebook contains the possible codewords (beams) and in each step one of the possible beams is chosen. The beams in the first steps are relatively wider and step by step the selected beams become narrower so as to converge to the dominant path and hence provide the information about the channel. In general, codebook-based beamforming can reduce the complexity of beamforming architectures but it may impose some performance degradation to the system.

Present day beamforming architectures proposed in the art are mostly based on the availability of the channel state information or at least an estimation of that. In massive MIMO systems with massive number of antenna elements at base station, capturing the channel state information is either impossible or significantly costly. In particular, most of the existing approaches, especially those with codebook-based beamforming, are usually iterative. That makes them very time consuming and complex and hence, makes them unsuitable to be employed in the next generation of wireless communication with the stringent latency constraint.

Therefore, there is a need for a beamforming architecture with associated apparatus and methods, that obviates or mitigates one or more limitations in the prior art.

This background information is intended to provide information that may be of possible relevance to the present invention. No admission is necessarily intended, nor should be construed, that any of the preceding information constitutes prior art against the present invention.

SUMMARY OF THE INVENTION

Embodiments of the present disclosure generally provide for methods and apparatus for selecting a codeword for use in configuring MIMO communications systems that alleviates the need to regularly determine CSI which can be time and power intensive, especially in large scale MIMO systems.

Embodiments include a codebook-based beamforming architecture utilizing a random forest classification machine learning approach. The technical advantage of the proposed approach is that it can circumvent the necessity of channel sensing step (CSI estimation) when designing the beamforming architecture.

Embodiments may transform a random forest tree structure into an equivalent matrix that may be implemented in a content addressable memory (CAM). The use of a CAM to select codewords to configure MIMO transmissions provides a solution where the latency in determining a codeword does not significantly increase as the system scales in size or complexity.

According to an embodiment of the present disclosure, there is provided a method of data collection from a wireless channel. The method includes receiving, by user equipment (UE), from an access point (AP), a plurality of pilot signals over the wireless channel. Then, determining, by the UE, an index identifying a codeword selected from a pre-defined codebook in response to the UE receiving the plurality of pilot signals. The codeword is for use as a beamforming vector for use in a data transmission phase between the AP and the UE. Also, using the index as a label for a data set including the plurality of pilot signals. The label and the data set form a labeled data for training a random forest for use in selecting a data transmission beamforming codeword given a plurality of features derived from a second plurality of pilot signals received by the UE prior to the data transmission phase.

According to an embodiment of the present disclosure, there is provided a method of configuring data transmission. The method includes provisioning a user equipment (UE) with a trained random forest. Then, receiving, by the UE, a plurality of pilot signals from an access point (AP) over a wireless channel between the AP and the UE. Also, inputting features of the plurality of pilot signals into the random forest to obtain an index of a codeword of a pre-define codebook. The codeword is for use as a beamforming vector for use in configuring a data transmission phase from the AP to the UE. Then transmitting, by the UE, to the AP, the index.

According to an embodiment of the present disclosure, there is provided a method of configuring data transmission. The method includes transmitting, by the AP, a plurality of pilot signals to a user equipment (UE) over a wireless channel between the AP and the UE. Then, receiving, by the AP, from the UE, an index obtained by the UE inputting features of the plurality of pilot signals into a random forest to obtain an index of a codeword of a pre-defined codebook. Also, configuring, by the AP, a transmission phase by using the index to access the codeword for use as a beamforming vector of a transmission, and transmitting, by the AP to the UE, data.

In further embodiments, the codeword is selected to maximize a data transmission rate of the UE.

In further embodiments, the codeword is selected based on a known characteristic of the wireless channel, where the known characteristic of the wireless channel includes a channel state information (CSI).

In further embodiments, the plurality of features include real and imaginary parts of the plurality of a baseband version of the pilot signals.

In further embodiments, the random forest is implemented using a contents addressable memory (CAM), which may be a photonics-based CAM.

According to an embodiment of the present disclosure, there is provided one or more apparatus, or a system including a plurality of apparatus to implement any of the methods described herein. The apparatus may include wireless communications equipment such as an access point (AP), which may also be referred to as a base station (BS), or a user equipment (UE). Apparatus include a CPU and non-transitory mass storage for storing software for implementing and controlling parts or all of the methods described herein.

According to an embodiment of the present disclosure, there is provide an apparatus that comprises a transmitter configured to transmit to a user equipment (UE), over a wireless channel, a plurality of pilot signals having associated thereto pilot signal features. The apparatus also comprises a receiver configured to receive, from the UE, an index obtained by the UE by performing a random forest classification of the pilot signal features, the index having associated thereto a beamforming codeword of a pre-defined codebook. The apparatus further comprises a processor configured to obtain the beamforming codeword in accordance with the index and to encode data using beamforming code, for transmission to the UE.

In further embodiments of apparatus, the codeword may be selected to maximize a data transmission rate from the apparatus to the UE. In further embodiments of the apparatus, the codeword may be selected based on a known characteristic of the wireless channel, the known characteristic of the wireless channel including a channel state information. In further embodiments of the apparatus, the pilot signal features may comprise real and imaginary parts of a baseband version of the pilot signals. In further embodiments, the random forest classification may be implemented using a contents addressable memory (CAM). In further embodiments of the apparatus, the CAM may be a photonics-based CAM.

According to an embodiment of the present disclosure, there is provided a user equipment that comprises a receiver configured to receive, from an apparatus, over a wireless channel, a plurality of pilot signals having associated thereto pilot signal features. The user equipment also comprises a processor configured to classify the pilot signal features using a random forest classification to obtain an index, the index having associated thereto a beamforming codeword of a pre-defined codebook. The user equipment further comprises a transmitter configured to transmit to the apparatus, over the wireless channel, the index, the apparatus being configured to obtain the beamforming codeword in accordance with the index and to encode data using beamforming code, for transmission to the user equipment.

In further embodiments of the user equipment, the codeword may be selected to maximize a data transmission rate from the apparatus to the user equipment. In further embodiments of the user equipment the codeword may be selected based on a known characteristic of the wireless channel, the known characteristic of the wireless channel including a channel state information. In further embodiments of the user equipment, the pilot signal features may comprise real and imaginary parts of a baseband version of the pilot signals. In further embodiments of the user equipment, the user equipment may comprise a contents addressable memory (CAM) implementing the random forest classification. In further embodiments of the user equipment, the CAM may be a photonics-based CAM.

Embodiments have been described above in conjunctions with aspects of the present disclosure upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

FIG. 2 illustrates a generic inference phase of a random forest for codebook-based beamforming, according to an embodiment of the present disclosure.

It will be noted that throughout the appended drawings, like features are identified by like reference numerals.

DETAILED DESCRIPTION OF THE INVENTION

Figure 1:
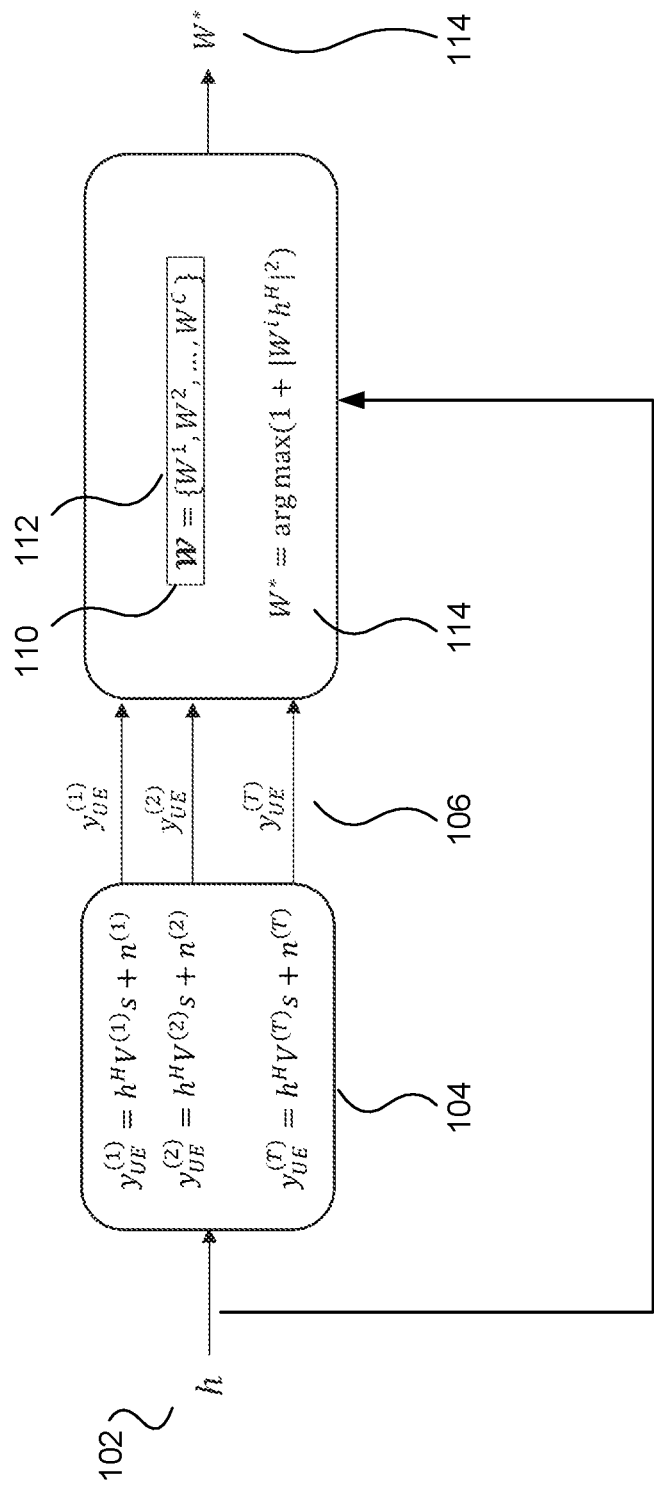
FIG. 1 illustrates a method of generating a single sample of a training set for training the random forest used in codebook-based beamforming, according to an embodiment of the present disclosure.

Embodiments of the present disclosure generally provide for a method and apparatus for the realization of highly-directed beams in MIMO systems that, in general, require a precise and reliable estimate of channel state information (CSI) that can significantly accelerate the beamforming design in mmWave massive MIMO systems. Embodiments include a codebook-based beamforming architecture utilizing a random forest classification machine learning approach. The significant advantage of embodiments described herein is that they can circumvent the necessity of channel sensing step (channel estimation) when designing the beamforming architecture.

Embodiments may also include content addressable memory (CAM) as an efficient platform to implement codebook-based beamforming architectures using a random forest classifier. That can significantly reduce the latency of the proposed architecture as a sufficiently optimal codeword can be selected in a single access to the CAM. In other words, the use of a CAM to select codewords to configure MIMO transmissions provides a solution where the latency in determining a codeword that does not significantly increase as the size of the system scales in size or complexity.

Embodiments may include a photonics-based CAM which can exploit the high bandwidth and the low power consumption of optical components.

Embodiments may be used to implement a three phase process. Phase one is for the purpose of training the random forest using labelled data. In this phase, labeled data is generated by using an explicit channel estimation step to capture an optimal codeword. It may be sufficient to only perform this step once in order to train the random forest and does not require any data transmission. Phase two is a channel training phase that in which pilot signals are transmitted to a UE and the UE utilizes the trained random forest to generate an index of an optimal codeword. The index may then be sent back to the AP. This channel training phase may be performed for any new channel realization. Phase three is a data transmission phase where the AP uses the index received from the UE to select an optimal codeword as a beamformer for the data transmission phase. The data transmission phase does not require the use of pilot signals which were transmitted in the channel training phase.

The invention can be used in many different wireless communication systems including, but not limited to, mmWave massive MIMO systems. In particular, it can be used in any kind of receiver to determine the beamformer that should be used by the transmitter to transmit data.

Embodiments include a codebook-based beamforming architecture that utilizes a random forest classifier to capture an optimum beamforming vector (codeword) among the set of pre-defined beamforming vectors (codebooks) available. As used herein, a beamforming vector may be referred to as a "codeword," while a set of pre-defined beamforming vectors may be referred to as a "codebook" 110. Embodiments may implement the codebook-based beamforming architecture with electronic or communications devices that store the codebook in a CAM. In embodiments photonics-based CAM may be used. The use of a CAM provides the technical benefit of allowing the retrieval of a near-to-optimal beamformer vector (codeword) with a constant latency that does not vary significantly as the size and complexity of the MIMO system increases.

In an embodiment, a downlink wireless communication system includes an access point (AP) (which may also be known as a base station (BS)) equipped with M antenna elements and a single-antenna user equipment (UE) communicating over a frequency-division duplex (FDD) channel, h, 102. Moreover, in this embodiment, that there is a single dominant channel path (Line-of-Sight) between the AP and the UE.

Embodiments include a method of data collection from a wireless channel. A data collection step may be performed to provide labeled data required for training a random forest for a codebook-based beamforming architecture. In this step, characteristics of the channel, including channel state information (CSI) of the channel, may be determined. In the data collection step, the channel characteristics may be measured or estimated by an AP first transmitting, a plurality of pilot signals over the wireless channel to the UE. The UE receives the pilot signals and evaluates them to determine a received signal quality. The UE then estimates the channel so as to select a codeword from a pre-defined codebook that best identifies an optimal precoding vector, i.e., an optimal codeword from the codebook. The codeword may be indicated using an index into the codebook which may be simpler or less complex than the codeword itself. The UE may then communicate the selected codeword back to the AP by sending the index. The index identifying the selected codeword may then be received by the AP which allows the AP to identify the selected codeword by accessing its pre-defined codebook using the index. The codeword may then be used as a beamforming vector for use in a data transmission phase between the AP and the UE. In embodiments, the index may also be used as a label for a training data set that includes the plurality of pilot signals. The label and the data set form labeled data that may be used for training a random forest for use in selecting a data transmission beamforming codeword given a plurality of features derived from a second plurality of pilot signals received by the UE in a channel training phase prior to a data transmission phase.

Embodiments include a method of configuring data transmission using a trained random forest. The method includes provisioning a UE with a trained random forest. Then during channel training phase, the UE first receives a plurality of pilot signals from an AP over a wireless channel between the AP and the UE. Features may be extracted from the plurality of pilot signals and used as inputs to the random forest to obtain an index of a codeword of a pre-define codebook. The codeword may then be used as a beamforming vector for use in configuring data transmission phase from the AP to the UE. This allows an optimal, pre-selected codeword to be selected by the index that may be determined using the pilot signals.

Embodiments include other methods of configuring data transmission. A method includes an AP transmitting a plurality of pilot signals to a UE over a wireless channel between the AP and the UE in a channel training phase, prior to a data transmission phase. The UE received the plurality of pilot signals and extracts features from the pilot signals that may be used as inputs to a pre-provisioned random forest to obtain an index of a codeword of a pre-defined codebook. The UE may then transmit the index back to the AP. When the AP receives the index, it may also use the index to access the selected codeword from the codebook. The AP may then use the codeword as a beamforming vector to configure a data transmission phase to transmit date to the UE.

In embodiments, the codeword may be selected to maximize a data transmission characteristic. The data transmission characteristic may be a data transmission rate of the UE. The data transmission characteristic may also be a signal-to-noise-ration (SNR) of a received data transmission by the UE.

In embodiments, the codeword may be selected based on a known characteristic of the wireless channel, such as a channel state information (CSI).

In embodiments, the plurality of features extracted from a plurality of pilot signals includes real and imaginary parts of baseband versions of the plurality of pilot signals.

In embodiments, the random forest may be implemented using a content addressable memory (CAM), which may be a memristor-based CAM, a ternary CAM, or a photonics-based CAM. A CAM provides the benefit that it may accelerate the classification performed by a decision tree or a random forest due to the fact that traversing the trees may be performed in a single operation with a delay or latency that varies little depending on the inputs. A photonics based CAM further provides the ability to exploit the high bandwidth and low latency of conducting operations in the optical domain.

Embodiment also include a variety apparatus, or a system including a plurality of apparatus to implement any of the methods described herein. The apparatus may include, but are not limited to, wireless communications equipment such as an access point (AP), which may also be referred to as a base station (BS), or a user equipment (UE).

With reference to FIG. 1, in order to efficiently define or determine a precoding vector for the M antenna elements of the AP, a channel training phase may be used to first determine the characteristics of the channel 102, the CSI. In the channel training phase, the AP transmits a plurality of signals, which may be referred to as pilot signals 106, to the UE. The UE may respond by transmitting feedback signals to the AP. The pilot signals 106 and feedback signals may then be used to determine information about the coefficients of the channel 102 between the AP and the UE. The pilot signals 106, transmitted from AP to the UE in the channel sensing phase, can be written as:

$$y_{UE}^{(\tau)} = h^H V^{(\tau)} s + n^{(\tau)}, \tau=1,2,\ldots T,$$

where h denotes the channel 102 between the AP and the UE, $V^{(\tau)}$ denotes the initial beamformer vector at the AP, which can be fixed or chosen randomly for each channel realization, s denotes the pilot signal that is considered to be the same for all the pilot signals 106 ($y_{UE}^{(\tau)}$, $\tau=1, 2, \ldots, T$), and finally $n^{(\tau)}$ denotes the circular complex Gaussian noise in the $\tau^{th}$ pilot. Moreover, T represents the number of pilots transmitted by the BS in a specific channel realization.

Once determined, the codebook 110 containing the set of pre-defined beamforming vectors may be known to both the AP and the UE and can be expressed as:

$$W = \{W^1, W^2, \ldots, W^C\}$$

where $W^i$ 112 denotes the $i^{th}$ beamforming vector candidates that can be used for data transmission. A main goal of configuring a transmission system is to choose the near-optimal beamforming vector, W* 114, so as to satisfy a considered objective function, for example, a received signal-to-noise ratio (SNR) received by the UE or another objective. The codebook 110 may be expressed in differing ways with a discrete Fourier transform (DFT) matrix being a common choice for the beamforming codebook in a codebook-based beamforming architecture.

Embodiments include a codebook-based beamforming that utilize a "random forest" (RF) classifier to find the best beamforming vector (a codeword) among the set of possible candidates (a codebook 110). Random forest, which is an ensemble method for classification and regression, operates by constructing a multitude of decision trees at training time, and is a supervised machine learning approach. A random forest needs to have labeled data to be trained. The first step in training the random forest (RF) to be employed in a codebook-based beamforming is to prepare the labeled data. Embodiments consider the pilot signals 106, $y_{UE}^{(\tau)}$, transmitted by the AP as the features (attributes) of the input data to be processed by the "trees" in the random forest. Each sample of labeled data may be expressed as a pair, $\{Y^T, \text{idx}(W^*)\}$, where $Y^T$ denotes the set of pilots transmitted to the UE, namely, $$Y^T = [p_r^1 + j p_{im}^1, p_r^2 + j p_{im}^2, \ldots, p_r^C + j p_{im}^C],$$

with $p^i = y_{UE}^i = h^H V^i s + n^i$, and $p_r^i$ and $p_{im}^i$ denote the real part and imaginary part of a complex-valued pilot signal, respectively. The label of the data sample may be denoted by idx(W*), where W* 114 is the optimal codeword chosen by the UE according to the received pilot signals 106. Note that the pilot signals 106 are considered digitalized and complex-valued. Since random forest conventionally works with real values, embodiments consider the training set as $\{\tilde{Y}^T, W^*\}$, where $\tilde{Y}^T$ denotes the real-valued representation of $Y^T$ as follows:

$$\tilde{Y}^T = [p_r^1, p_r^2, \ldots p_r^C, p_{im}^1, \ldots p_{im}^C].$$

In order to generate the labels, i.e., the class of the codeword that provides the maximum received SNR by the UE, the channel 102, h, may be known in the training phase of the random forest, and accordingly, the optimal codeword 114 can be selected as follows $$W^* = \operatorname{argmax}(1 + |W^i h^H|^2).$$

When an entire training set is generated, the random forest model can be trained using various software packages or frameworks, such as Python packages like scikit-learn. Moreover, different values of hyper-parameters can be evaluated to select the optimal parameters, in particular, the optimal number of decision trees (estimators) and the optimal value for the maximum depth of the trees.

With reference to FIG. 2, for a trained random forest 202, in an inference phase a UE can exploit only the transmitted pilots in each channel realization, without requiring to capturing the channel state information so as to select the best beamforming vector (codeword 114) based on the set of pilot signals 106 received without requiring any channel state information directly.

Figure 3A:
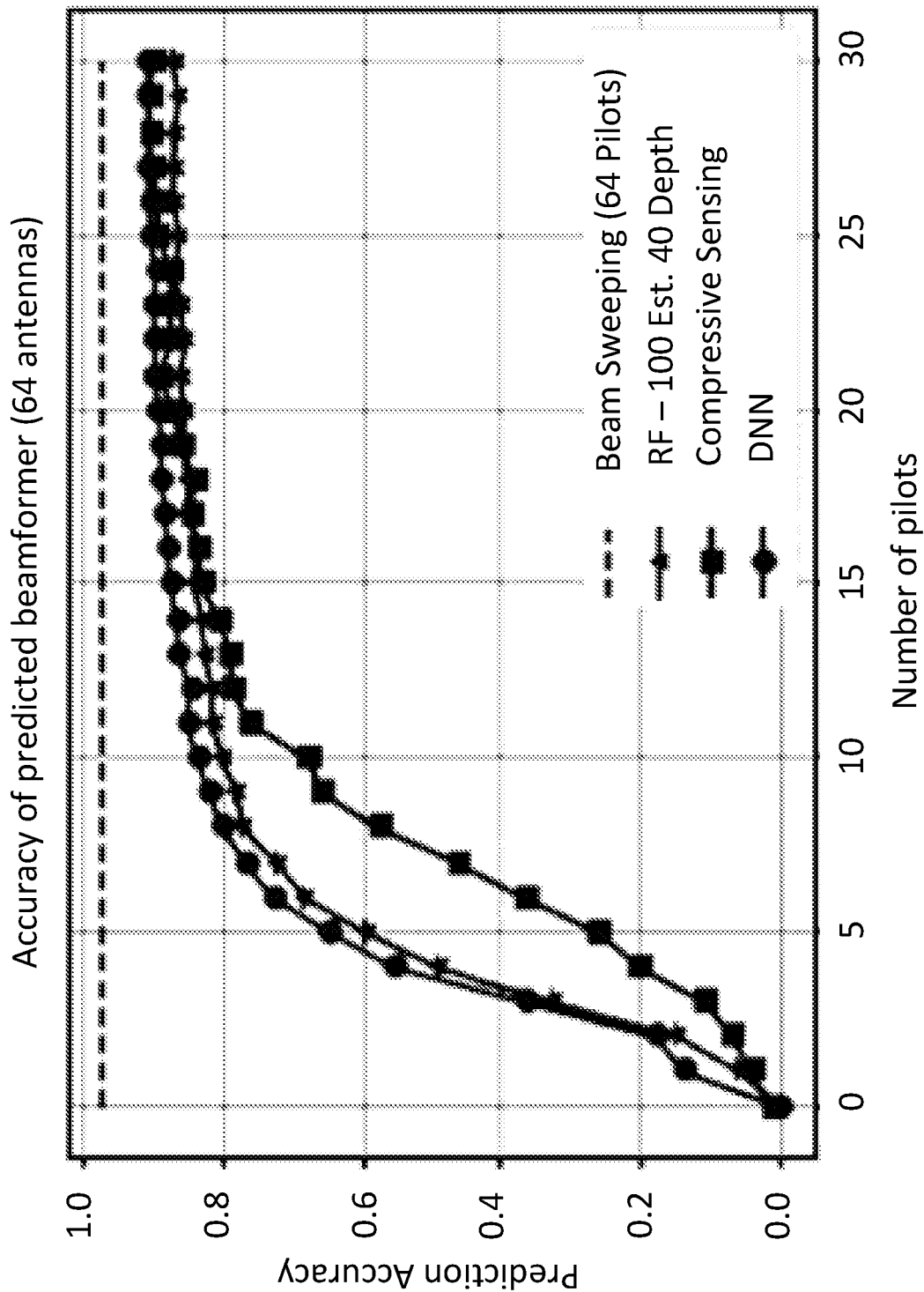
FIGS. 3a and 3b illustrate results of an evaluation of the performance and the complexity of a beamforming architecture, according to an embodiment of the present disclosure.
Figure 3B:
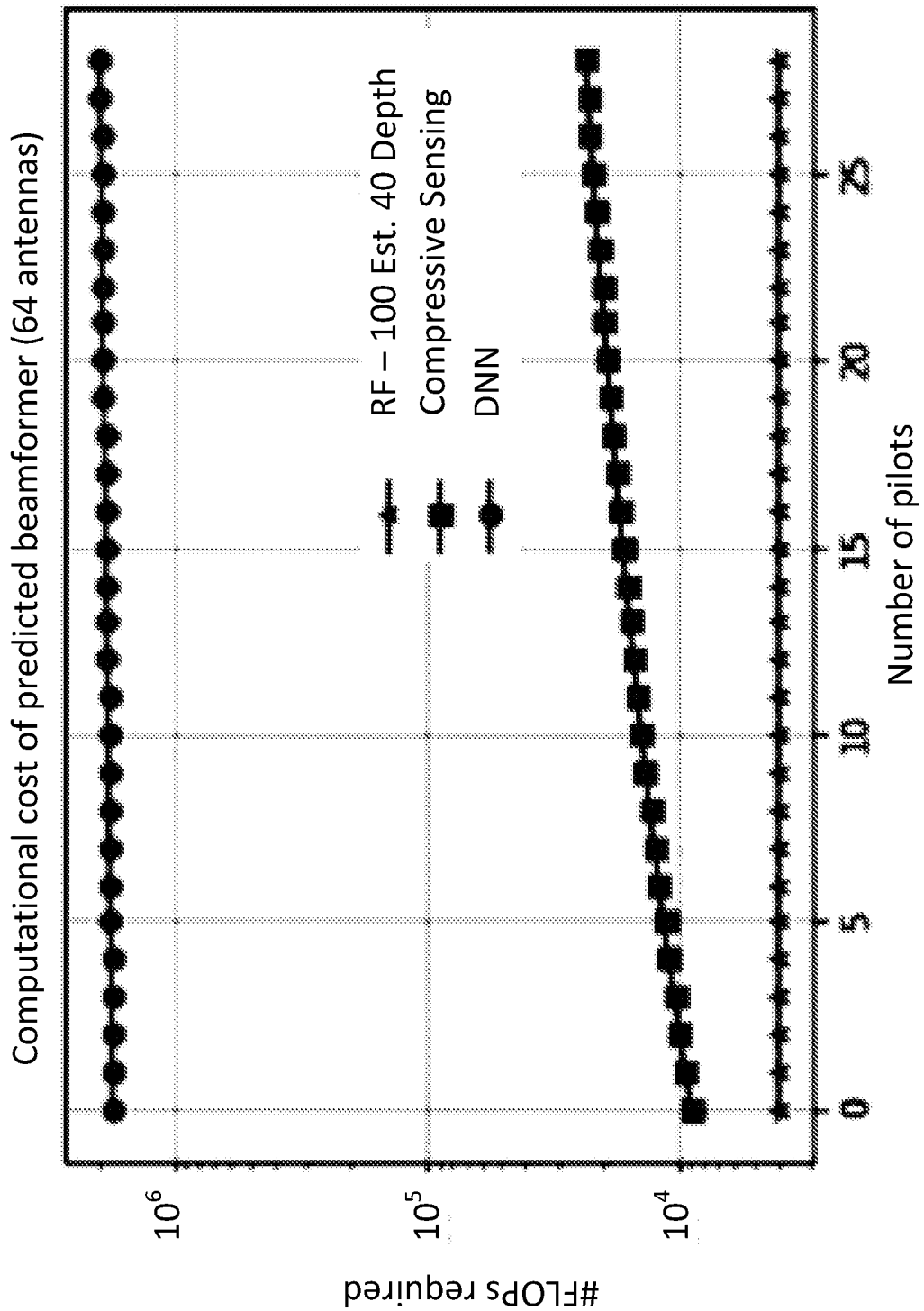

With reference to FIGS. 3a and 3b, in order to evaluate the performance and the complexity of embodiments using a codebook-based beamforming architecture, the embodiments as described herein may be compared that with some of the existing methods known in the art. In particular, the accuracy and computational cost (the number of Floating Point Operations (FLOPs)) of embodiments may be compared with those of exhaustive beam sweeping, compressive sensing, and DNN-based approaches. FIGS. 3a and 3b consider the case of a single-path system with a single-antenna UE and an AP equipped with 64 antennas. It can be seen the proposed approach outperforms the compressive sensing approach, especially for relatively small number of pilots, and can reach to the performance of the DNN-based approach, while the complexity of the proposed method is significantly lower than that of the DNN-based one.

The embodiments may be generalized for use in multi-user massive MIMO systems.

The embodiments may be generalized to multi-path massive MIMO systems with multiple users.

Embodiments may be considered in frequency-division duplex (FDD) scenarios when the uplink channel is different from the downlink channel, requiring the use of a pilot training phase. Also, embodiments may be used in time-division duplexing (TDD) systems considering the reciprocity of the channel in uplink and downlink. In that case the random forest architecture may be employed by the AP to determine the best beamforming candidates in an available codebook. This may be especially applicable in scenarios in which the AP has a limited number of radio frequency chains, and hence, may adopt an analog or hybrid beamforming architecture.

Figure 4:
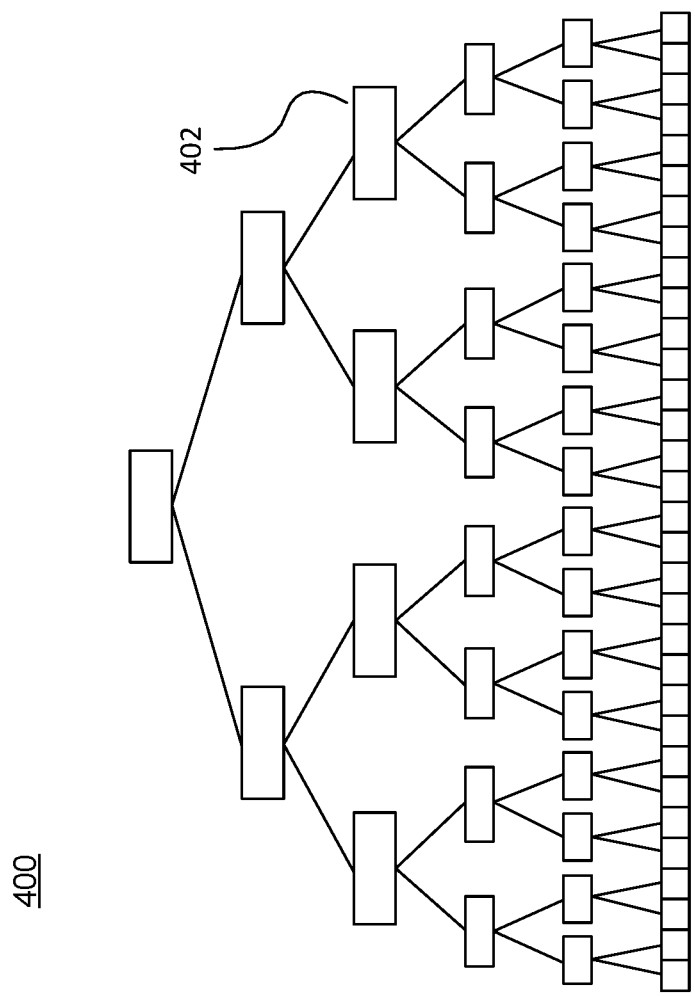
FIG. 4 illustrates a scheme of a single tree in a random forest trained for a beamforming architecture, according to an embodiment of the present disclosure.

Referring to FIG. 4, embodiments may utilize a CAM, such as an electronics-based CAM to implement decision tree and random forest classifiers with high power and time efficiency due to the fact that the whole classification, i.e., traversing all trees, can be performed in a single operation (which may include multiple sub-operations). Also, the latency and delay of the operations does not significantly vary based on the data to be retrieved from the CAM. In embodiments, a codebook-based beamforming architecture using random forest may be implemented using an electronics-based CAM. In these embodiments, the structure of each of the trees in the random forest is implemented on a CAM unit. In order to implement a decision tree on a CAM unit, each node of the tree, for example, node i, is represented by a CAM cell which stores a range (including an upper bound and/or a lower bound) of the feature associated with the node i of the tree.

FIG. 4 depicts a representative decision tree of an random forest trained for embodiments described herein. In this example, each node, such as node 402, represents a range (a lower bound and/or an upper bound) for the associated feature, which is the real part or the imaginary part of one of the pilot signals 106.

Figure 5:
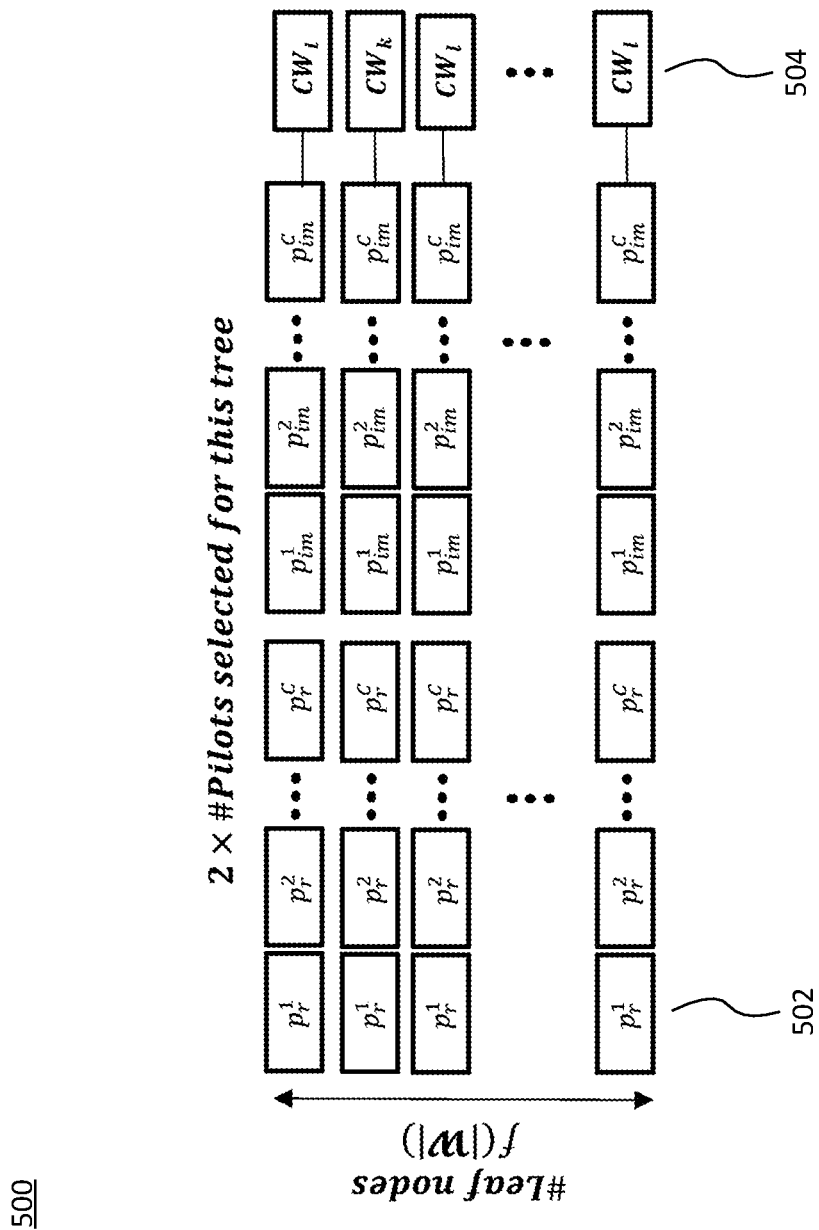
FIG. 5 illustrates matrix representation of a scheme of a single tree in a random forest trained for a beamforming architecture, according to an embodiment of the present disclosure.

FIG. 5 illustrates a schematic representation 500 of implementing a generic decision tree 400 of a trained random forest on a CAM. Each block 502 is representing a single node 402 of the tree comprising of the range of the associated feature, i.e., a real or imaginary part of a pilot signal 106. In this figure each row is showing a single path in the tree from the root node to the leaf node. The rightmost boxes 504 then illustrate the class that the path would reach to. It is possible for more than one path to reach to a specific class. The columns in the figure are showing the features considered by the tree. Note that as FIG. 4 depicts a generic tree, all the features may be included in all the paths, while in a practical scenario this may not be the case, since there might be some paths that include a subset of features rather than all of them.

When new data arrives, it will be processed through all the rows of the tree simultaneously. If, for all the CAM cell in a path, that input data satisfies the upper bound, the lower bound, or both the upper bound and the lower bound of the feature, which may be stored in each of the CAM cell as conductance values of the memristors, the matching line of that path remains charged (with the default state to be charged), and hence, the class associate to that path is selected as the class that the input belongs to. Since the latency to retrieve codewords from a codebook implemented in a CAM does not vary significantly, the time required to process a decision tree classifier may be significantly reduced compared to present day solutions.

Embodiments disclosed herein can be generalized to a random forest, where each tree of the random forest is implemented on a CAM unit. As discussed above, a random forest may perform the classification through majority voting among its decision trees. Furthermore, in embodiments, in-memory computing (IMC) may be used to implement majority voting, for example, by using a resistive random access memory (RRAM) to increase the throughput and power efficiency of the random forest. The RRAM array comprises of rows that are connected to the leaf nodes of all of the trees in the random forest, and the columns may represent each possible class that an input may belong to. In other words, for the beamforming example considered in this embodiment, for each of the beamforming vectors in the beamforming codebook in the proposed beamforming architecture. If the class that the $i^{th}$ path reaches is equal to the class associated with the $j^{th}$ column, the component (memristor) placed at the intersection between the $i^{th}$ row and the $j^{th}$ column, $M_{i,j}$, may be set to the low resistance state (LRS), otherwise the memristor may be set to the high resistance state (HRS). This results in the maximum current flowing from $i^{th}$ row through the $j^{th}$ column when the class of the leaf node of a tree matches to the class indicated by the $j^{th}$ column and in the minimum current when there is a mismatch. The currents of all the columns are sensed with a chain of transimpedence amplifiers (TIAs), sample and hold circuits, and analog-to-digital converters. The final classification results may be determined by the class associated with the column with the maximum accumulated current.

Figure 6:
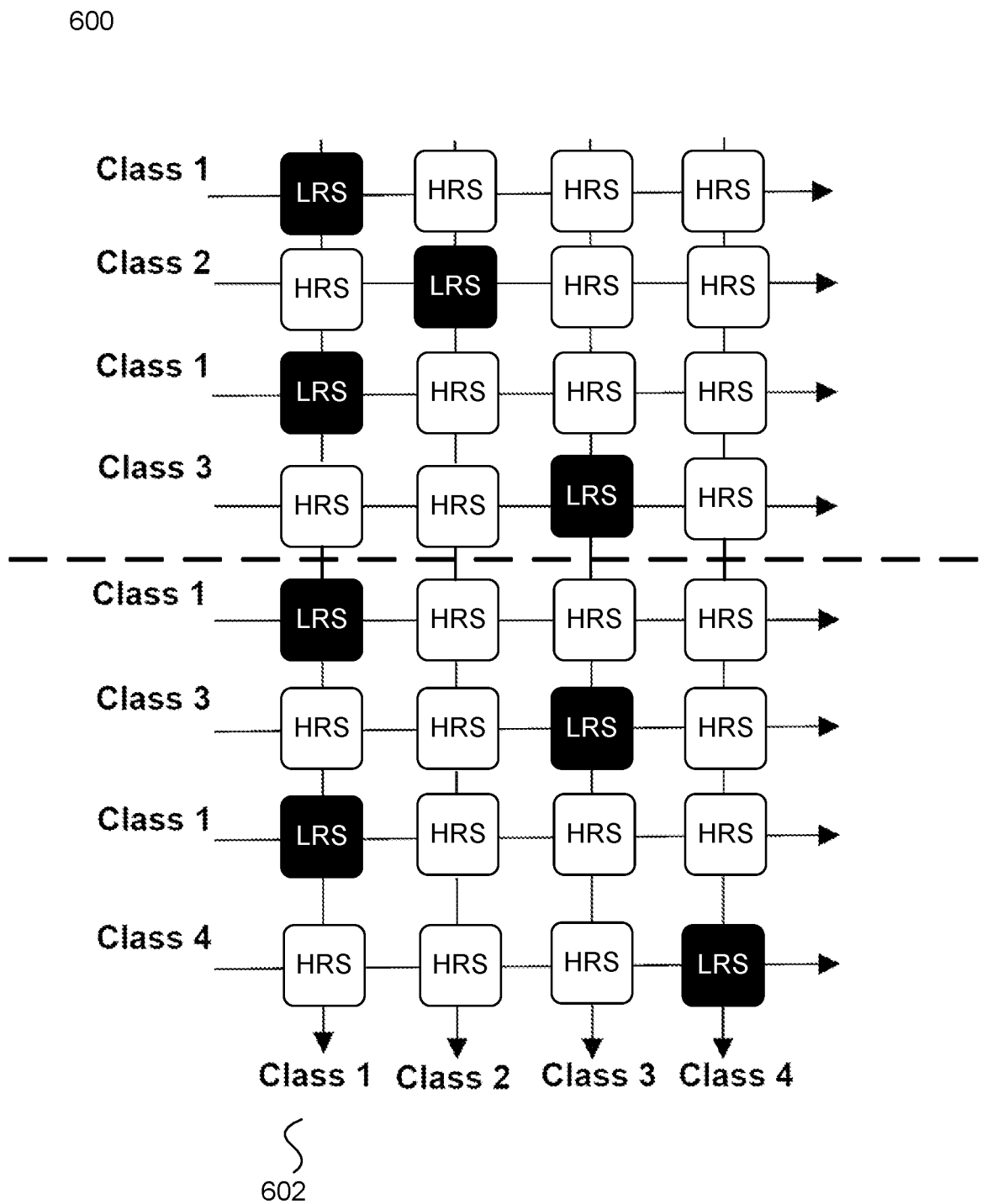
FIG. 6 provides a scheme of majority voting on a memristor array for an random forest with two estimators (trees) and four classes, according to an embodiment of the present disclosure.

With reference to FIG. 6, an embodiment illustrates a random forest 600 with four classes and two decision trees. It can be seen that the maximum current occurs at the first column 602 of the array, as shown by the number of dark boxes, indicating class 1 as the result of the classification procedure.

Figure 7:
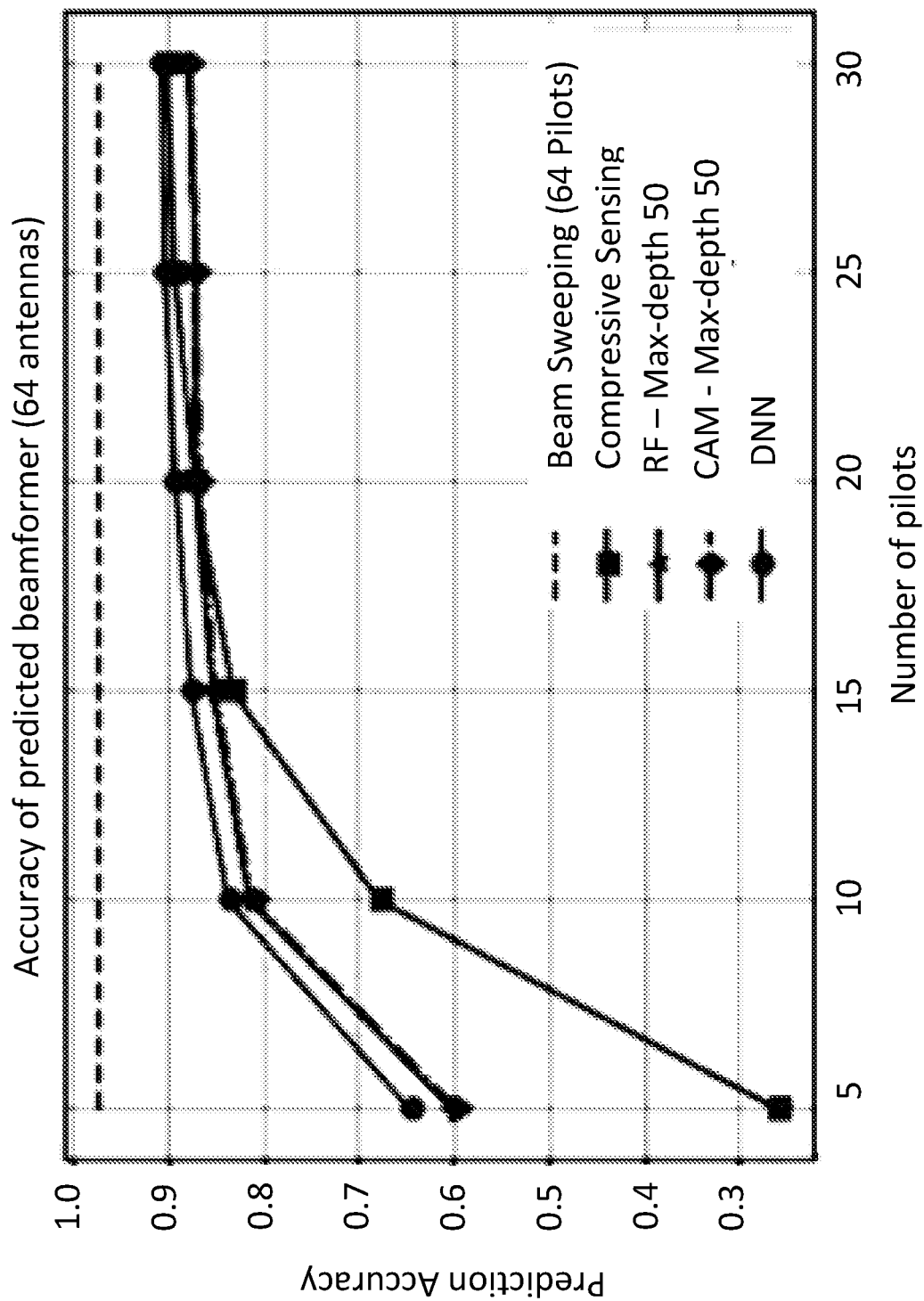
FIG. 7 illustrates the performance of the codebook-based beamforming using random forest implemented on electronics-based CAM, according to an embodiment of the present disclosure.

FIG. 7 illustrates the performance of an embodiment implemented using an electronics-based CAM. In this simulation the memristors are programmed to 8-bit precision. It can be seen CAM implementation of a random forest can match the performance of a random forest implemented on digital electronics (i.e., using GPU) using other methods.

Embodiments that implement a beamforming architecture using random forest can be implemented on photonics-based CAM. Photonics-based CAM have an advantage of due to the high bandwidth and the power efficiency of optical components that can accelerate the random forest classification, and in particular, the proposed beamforming architecture disclosed herein.

Figure 8:
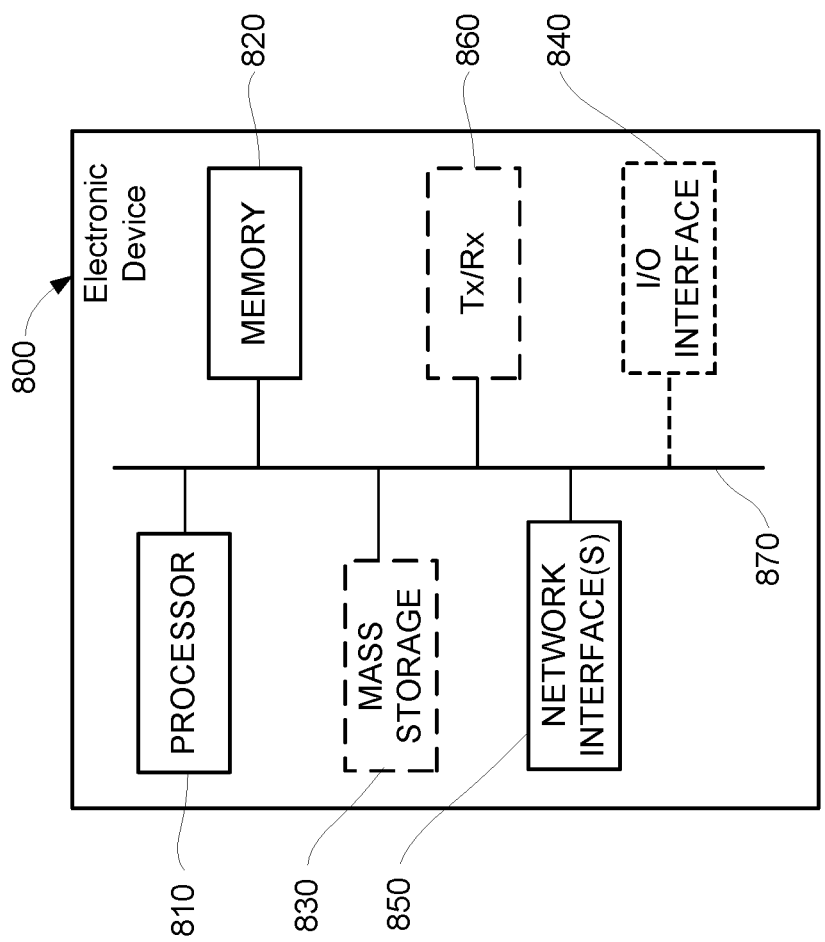
FIG. 8 provides a schematic diagram of an electronic device that be used to implement embodiments of the present disclosure as described herein.

FIG. 8 is a schematic diagram of an electronic device 800, one of more of which may be incorporated into an AP, a UE, or other computing devices used for embodiments of the present disclosure as described herein. It is also noted that electronic devices directing operations of embodiments of the present disclosure may be microcontrollers or microprocessors which execute program instructions stored in-memory, or other digital or analog circuitry, or a combination thereof.

As shown, the device includes a processor 810, such as a Central Processing Unit (CPU) or specialized processors such as a Graphics Processing Unit (GPU) or other such processor unit, memory 820, non-transitory mass storage 830, I/O interface 840, network interface 850, and a transceiver 860, all of which are communicatively coupled via bi-directional bus 870. According to certain embodiments, any or all of the depicted elements may be utilized, or only a subset of the elements. Further, the device 800 may contain multiple instances of certain elements, such as multiple processors, memories, or transceivers. Also, elements of the hardware device may be directly coupled to other elements without the bi-directional bus.

The memory 820 may include any type of non-transitory memory such as static random access memory (SRAM), dynamic random access memory (DRAM), synchronous DRAM (SDRAM), read-only memory (ROM), any combination of such, or the like. The mass storage element 830 may include any type of non-transitory storage device, such as a solid state drive, hard disk drive, a magnetic disk drive, an optical disk drive, USB drive, or any computer program product configured to store data and machine executable program code. According to certain embodiments, the memory 820 or mass storage 830 may have recorded thereon statements and instructions executable by the processor 810 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the disclosure as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, cellular phone, network device, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method of data collection from a wireless channel, the method comprising:
   receiving, by user equipment (UE), from an access point (AP), a plurality of pilot signals over the wireless channel;
   determining, by the UE, an index identifying a codeword selected from a pre-defined codebook in response to the UE receiving the plurality of pilot signals, the codeword for use as a beamforming vector for use in a data transmission phase between the AP and the UE; and
   using the index as a label for a data set including the plurality of pilot signals, the label and the data set forming a labeled data for training a random forest for use in selecting a data transmission beamforming codeword given a plurality of features derived from a second plurality of pilot signals received by the UE during a channel training phase prior to the data transmission phase.

2. The method of claim 1 wherein the codeword is selected to maximize a data transmission rate of the UE.

3. The method of claim 1 wherein the codeword is selected based on a known characteristic of the wireless channel, the known characteristic of the wireless channel including a channel state information.

4. The method of claim 1 wherein the plurality of features comprise real and imaginary parts of a baseband version of the plurality of pilot signals.

5. The method of claim 1 wherein the random forest is implemented using a contents addressable memory (CAM).

6. The method of claim 5 wherein the CAM is a photonics-based CAM.

7. A method of configuring data transmission, the method comprising:
   provisioning a user equipment (UE) with a trained random forest;
   receiving, by the UE, a plurality of pilot signals from an access point (AP) over a wireless channel between the AP and the UE;
   inputting features of the plurality of pilot signals into the random forest to obtain an index of a codeword of a pre-define codebook, the codeword for use as a beamforming vector for use in configuring a data transmission phase from the AP to the UE; and
   transmitting, by the UE, to the AP, the index.

8. A method of configuring data transmission, the method comprising:

transmitting, by an access point (AP), a plurality of pilot signals to a user equipment (UE) over a wireless channel between the AP and the UE;

receiving, by the AP, from the UE, an index obtained by the UE inputting features of the plurality of pilot signals into a random forest to obtain an index of a codeword of a pre-defined codebook;

configuring, by the AP, a data transmission phase by using the index to access the codeword for use as a beamforming vector of a transmission; and transmitting, by the AP to the UE, data.

9. An apparatus, comprising:
a transmitter configured to transmit to a user equipment (UE), over a wireless channel, a plurality of pilot signals having associated thereto pilot signal features;
a receiver configured to receive, from the UE, an index obtained by the UE by performing a random forest classification of the pilot signal features, the index having associated thereto a beamforming codeword of a pre-defined codebook; and
a processor configured to obtain the beamforming codeword in accordance with the index and to encode data using beamforming code, for transmission to the UE.

10. The apparatus of 9 wherein the codeword is selected to maximize a data transmission rate from the apparatus to the UE.

11. The apparatus of claim 9 wherein the codeword is selected based on a known characteristic of the wireless channel, the known characteristic of the wireless channel including a channel state information.

12. The apparatus of claim 9 wherein the pilot signal features comprise real and imaginary parts of a baseband version of the plurality of pilot signals.

13. The apparatus of claim 9 wherein the random forest classification is implemented using a contents addressable memory (CAM).

14. The apparatus of claim 13 wherein the CAM is a photonics-based CAM.

15. A user equipment, comprising:
a receiver configured to receive, from an apparatus, over a wireless channel, a plurality of pilot signals having associated thereto pilot signal features;
a processor configured to classify the pilot signal features using a random forest classification to obtain an index, the index having associated thereto a beamforming codeword of a pre-defined codebook; and
a transmitter configured to transmit to the apparatus, over the wireless channel, the index, the apparatus being configured to obtain the beamforming codeword in accordance with the index and to encode data using beamforming code, for transmission to the user equipment.

16. The user equipment of claim 15 wherein the codeword is selected to maximize a data transmission rate from the apparatus to the user equipment.

17. The user equipment of claim 15 wherein the codeword is selected based on a known characteristic of the wireless channel, the known characteristic of the wireless channel including a channel state information.

18. The user equipment of claim 15 wherein the pilot signal features comprise real and imaginary parts of a baseband version of the plurality of pilot signals.

19. The user equipment of claim 15, further comprising a contents addressable memory (CAM) implementing the random forest classification.

20. The user equipment of claim 19 wherein the CAM is a photonics-based CAM.

* * * * *